July 25, 1939.  J. G. MORGAN  2,166,998

METHOD OF BRAZING TURBINE BLADES

Filed Aug. 2, 1938

WITNESSES:

INVENTOR
JOHN G. MORGAN.
BY
ATTORNEY

Patented July 25, 1939

2,166,998

UNITED STATES PATENT OFFICE 2,166,998

METHOD OF BRAZING TURBINE BLADES

John G. Morgan, Collingdale, Pa., assignor to Westinghouse Electric & Manufacturing Company, East Pittsburgh, Pa., a corporation of Pennsylvania Application August 2, 1938, Serial No. 222,584

1 Claim. (Cl. 29—156.8)

My invention relates to turbine blade manufacture and it has for its object to provide an improved way of soldering or brazing together blade and packing piece sections.

In the patent to Carl R. Soderberg No. 2,063,706 granted December 8, 1936, there is disclosed and claimed a method of manufacturing individual turbine blades from blade and packing piece sections, a blade and packing piece section being initially correctly positioned relatively, tack welded, and then brazed, the purpose of the tack-welding being largely to provide a means of attachment of the blade and packing piece sections while the blades are being brazed. While this method is satisfactory for most blades, it is not so desirable for blades of the larger sizes, not only on account of the possibility of overheating the blade section, but also on account of the relatively large area to be brazed or soldered and the necessity for the solder to flow in between the conjugate surfaces. Accordingly, with blades of the larger sizes, I provide a process which makes possible preservation of accurate positioning of component parts in the final structure as well as the avoidance of the possibility of overheating the blade section. More particularly, I provide blade and packing piece sections having lapping surfaces to be joined and, with the sections held in superimposed relation with soldering material interposed between such surfaces, heat is applied to the packing piece section to effect fusion of the solder. The step of fusion is effected by the application of heat to the packing piece section, precautions being taken to avoid, so far as possible, the direct application of heat to the blade section, with the result that the soldering temperature may be attained without impairing the desired physical properties of the material of which the blade section is made. The importance of applying heat in this manner will be apparent when it is considered that suitable soldering or brazing materials must have a relatively high melting temperature because, not only must the joint be adequately strong but it must be capable of enduring fairly high turbine temperatures. Preferably, I use silver solder or brazing material having a melting temperature of the order of 1100° F.

With a solder having a high fusion temperature, it is essential that special precautions be taken in the step of fusion to avoid overheating the blade section with possible softening of the latter. To accomplish this result, I provide a special type of furnace having a fixture therein for supporting packing piece and blade sections in superimposed relation, the furnace having a special arrangement of heating devices, for example, gas flames, so arranged and directed that heat is applied thereby only to the packing piece section with increase in temperature of the material thereof until the solder is fused and forms an autogenous connection with the adjacent parts. Suitable means is associated with a fixture to provide for the sustained application of pressure to the positioned parts so that the relative position thereof will be maintained after positioning and during the step of soldering or brazing, whereby it is assured that, not only will the solder or brazing material be uniformly distributed over the surfaces, but the engagement of the surfaces will be that desired and the final root portion will involve a minimum of departure from predetermined or desired dimensions.

This and other objects are effected by my invention as will be apparent from the following description and claim, taken in connection with the accompanying drawing forming a part of this application, in which:

Figure 1:
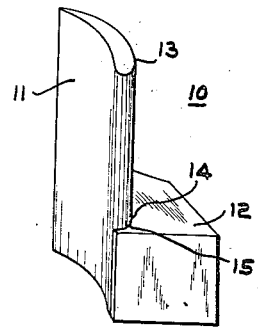
Fig. 1 is an elevational view of a turbine blade incorporating my improvement.
Figure 2:
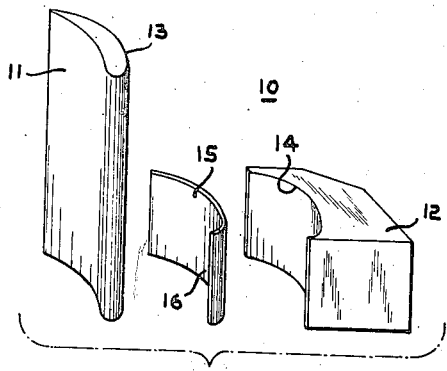
Fig. 2 is an exploded view showing the blade and packing piece sections, the fluxed conjugate surfaces thereof, and the intervening sheet of solder.

Referring now to the drawing more in detail, in Figs. 1 and 2, there is shown a turbine blade, at 10, comprising a blade section 11 and a packing piece section 12, the blade and packing piece sections having conjugate surfaces 13 and 14, respectively, bonded or autogenously connected together by means of solder or brazing material 15.

Figures 3, 4:
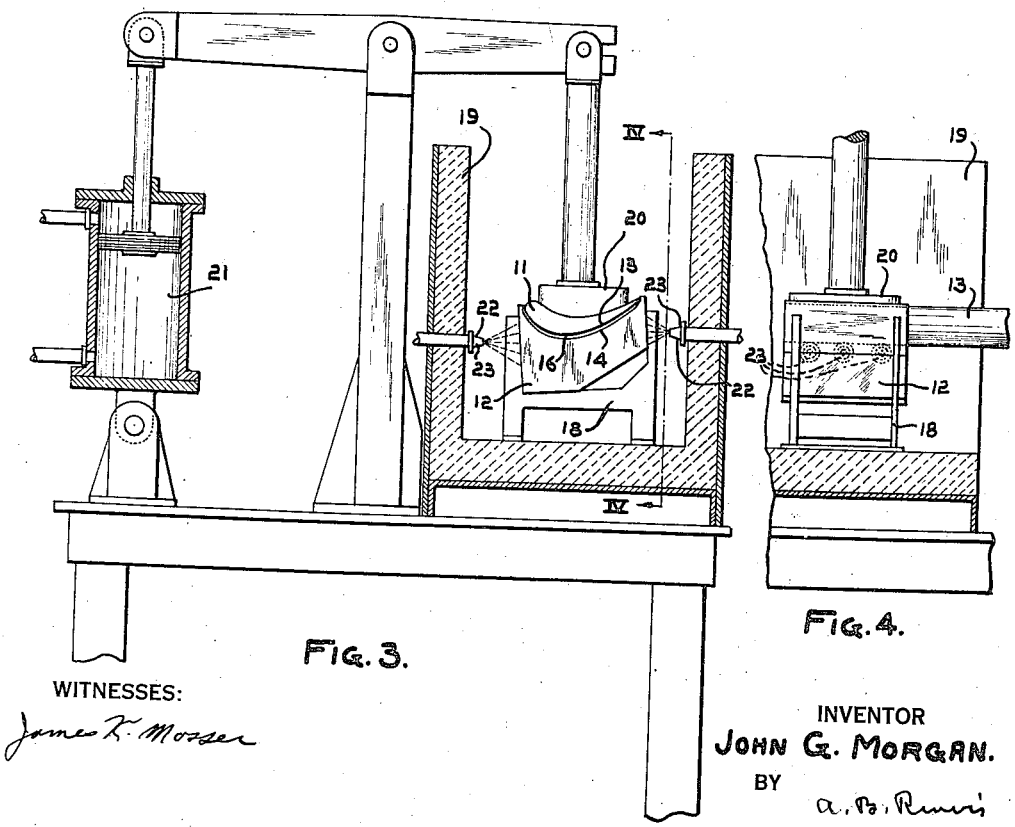
Fig. 3 shows a heating device or furnace providing for application of heat to a packing piece section incident to the soldering or brazing; and, Fig. 4 is a view taken along the line IV—IV of Fig. 3.

In accordance with my improved method, a blade section 11 and its packing piece section 12 are properly positioned relatively, the conjugate surfaces 13 and 14 being covered with flux, and the solder or brazing material, preferably in sheet form, as shown at 16 in Figs. 2 and 3, is interposed between the fluxed conjugate surfaces.

With the parts so prepared and positioned, pressure is applied to maintain the positioning of the parts, such application of pressure being sustained through the soldering or brazing period, not only to assure of a better brazed or soldered connection, but also of maintenance of the desired relative positions of the sections, heat being applied only to the packing piece section so as to bring the engaging portions up to a soldering or brazing temperature without such undue heating of the blade section as to result in impairment of physical properties thereof, such as softening.

To this end, as shown in Fig. 3, the sections 11 and 12 are properly positioned, the surfaces 13 and 14 having been suitably fluxed and a sheet of solder 16 being interposed therebetween. The parts arranged in this way are positioned in a fixture 18 arranged within a heating furnace 19. The packing piece section, sheet of solder and the blade section are clamped in superposed relation on the fixture by any suitable means, as by the ram or plunger 20, preferably operated by the hydraulic or pneumatic clyinder 21, the arrangement being such that the clamping pressure is maintained even though there should be a dimensional reduction due to fusion and spreading or filming of the solder. The furnace 19 is provided with any suitable heating means, at 22, the only requirement being that the heating means shall be so arranged that the direct application of heat therefrom to the blade section 11 is avoided. Accordingly, the heating means, at 22, is shown, for example, as being comprised by a multiplicity of gas jets 23 so located as to play gas flames directly on surfaces of the packing piece section 12 without contact thereof with the blade section 11 and with a minimum of transmission of radiant heat therefrom to the blade section. Heat is transmitted through the body of the packing piece to the surface 14, and, from the latter to the sheet of solder 16 and the suface 13. Upon the attainment of a sufficient temperature, the solder is fused and the surfaces 13 and 14 are thereby bonded or autogenously connected together.

With the foregoing arrangement, it will be apparent that, even though brazing or soldering material having a relatively high fusion temperature is used, for example, silver solder, overheating of the blade section is avoided for the reason that the highest level of temperature exists at a portion or portions, for example, the side edges, of the packing piece section remote from the blade section, and to which heat is directly applied, that is, the heat or gas flame is applied to the side edges of the packing piece section below the blade section, with the result that all heat for fusion is transmitted through the body of the packing piece section to the surfaces to be soldered and overheating or possible softening of the blade section are avoided.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claim.

What I claim is:

In the process of manufacturing a turbine blade wherein a packing piece is fastened in lapping relation with respect to one end portion of a blade section to provide a root portion for the blade comprising providing blade and packing piece sections having surfaces to be joined, supporting the packing piece section, superimposing the blade section on the packing piece section with soldering material arranged between the surfaces to be joined, applying pressure to the blade section to hold the superimposed parts in desired relative relation, and, with pressure applied to the blade section, applying heating flames to edges of the packing piece section below the blade section so that the packing piece section may have its temperature raised sufficiently to fuse the soldering material to effect a connection between the sections.

JOHN G. MORGAN.